(12) United States Patent
Borhofen

(10) Patent No.: US 7,410,076 B2
(45) Date of Patent: Aug. 12, 2008

(54) SELF-RELEASING, HEAT INSULATING PAN-HANDLE HOLDER

(76) Inventor: Robert H. Borhofen, 517 Mallard La., Trinity, TX (US) 75862

( * ) Notice: Subject to any disclaimer, the term of this patent is extended or adjusted under 35 U.S.C. 154(b) by 572 days.

(21) Appl. No.: 10/841,091

(22) Filed: May 7, 2004

(65) Prior Publication Data

US 2005/0006397 A1 Jan. 13, 2005

Related U.S. Application Data

(60) Provisional application No. 60/468,862, filed on May 8, 2003.

(51) Int. Cl.
*B65D 25/28* (2006.01)
*A47J 45/00* (2006.01)
(52) U.S. Cl. .......................... 220/753; 16/425
(58) Field of Classification Search ................ 220/753, 220/755, 757, 759; 16/406, 422, 425, 429, 16/431, 405, 411, 421, 435
See application file for complete search history.

(56) References Cited

U.S. PATENT DOCUMENTS

| | | | |
|---|---|---|---|
| 1,162,896 A | 12/1915 | Achberger | |
| 1,512,197 A * | 10/1924 | Borel | 220/753 |
| 2,073,475 A * | 3/1937 | Gordon | 294/33 |
| 2,609,563 A | 9/1952 | Budelman | |
| 4,197,611 A * | 4/1980 | Bell et al. | 220/753 |
| 4,209,877 A | 7/1980 | Colasent | |
| D456,667 S | 5/2002 | Veltri et al. | |

* cited by examiner

*Primary Examiner*—Anthony D. Stashick
*Assistant Examiner*—Harry A Grosso
(74) *Attorney, Agent, or Firm*—Sherman D. Pernia; Karen A. Rex

(57) ABSTRACT

A self-releasing pan-handle holder for thermally insulating a handle on pots and pans. The pan-handle holder is designed to receive the long handle on a pot or pan. The pan-handle holder comprises an insulating sleeve having a sleeve axis with first and second complimentary sections and a lumen, which allows for closely receiving a pan-handle. The pan-handle holder further includes a biasing mechanism for holding the first and second complimentary sections apart. When the pan-handle holder is placed on a pot or pan-handle, it is squeezed tightly and held around the pan-handle to protect the user from heat in the handle. Typically, the component parts of the of the present pan-handle holder are made of a non-metallic thermal insulating material.

6 Claims, 9 Drawing Sheets

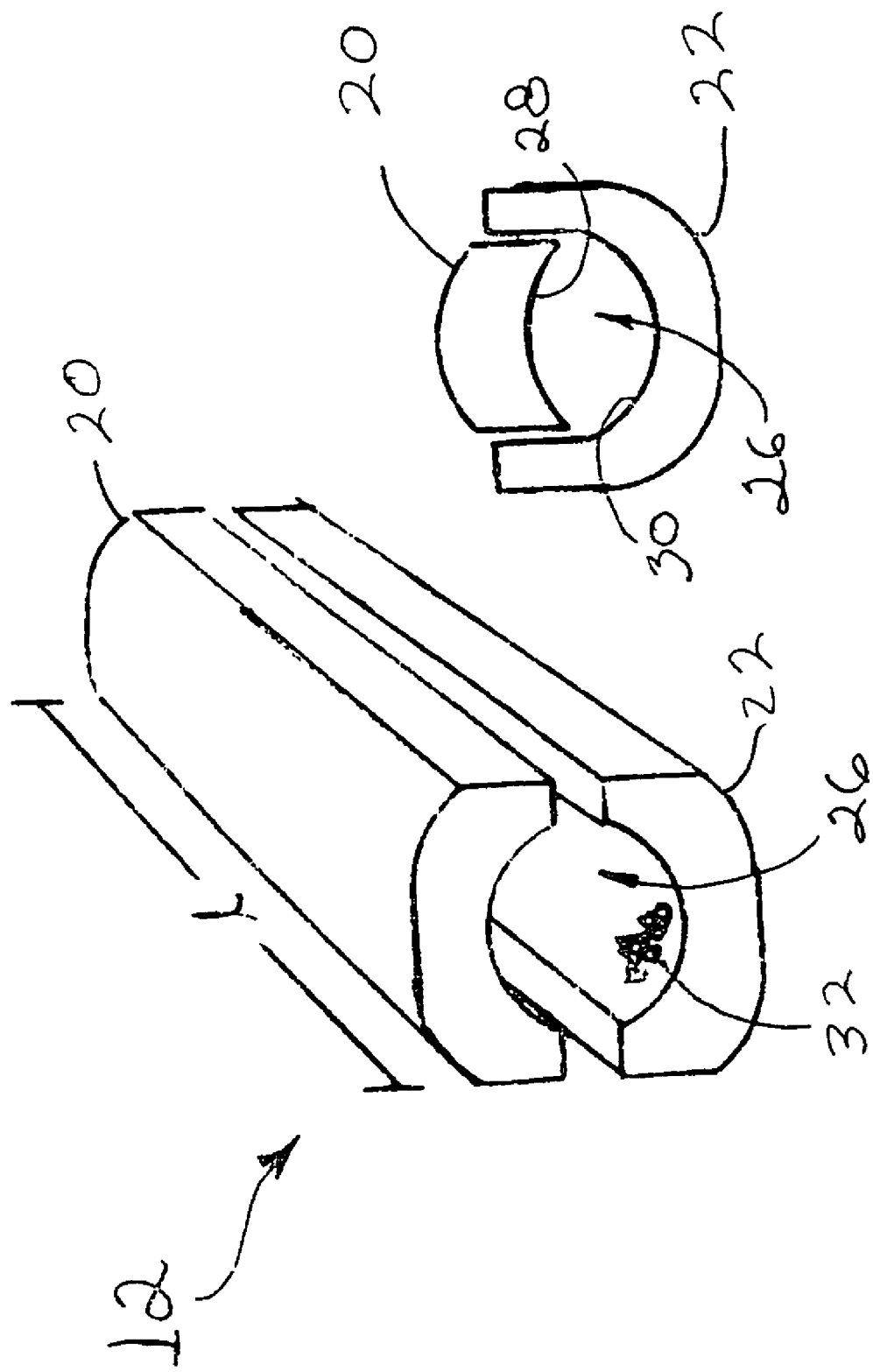

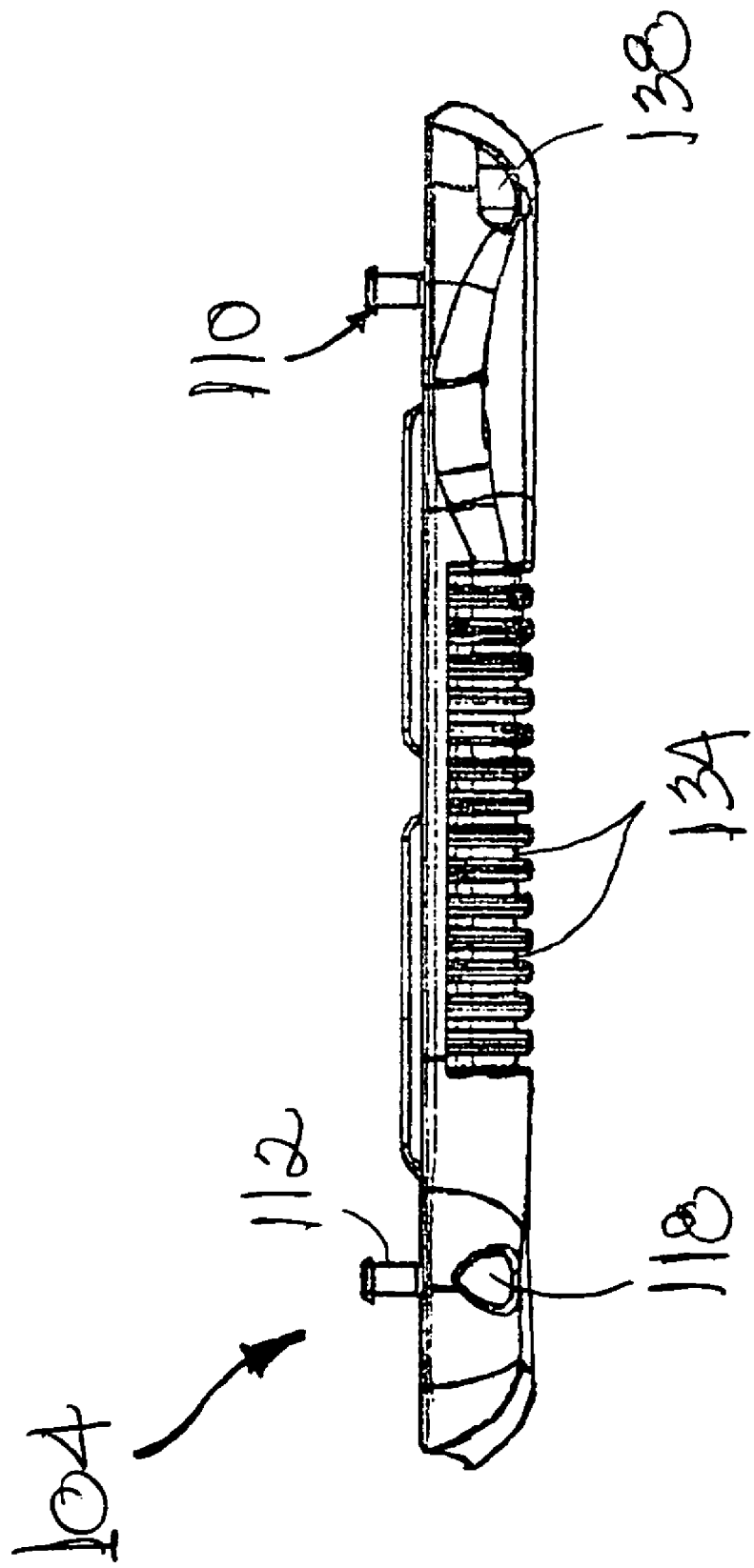

SELF-RELEASING, HEAT INSULATING PAN-HANDLE HOLDER

The present application claims the benefit of prior filed U.S. Provisional Application, Ser. No. 60/468,862 filed 8 May 2003, to which the present application is U.S. national utility application.

FIELD OF THE INVENTION

The present invention relates to a thermal insulated holder device which is readily attachable to and removable from the long handle of a pot or pan for the purpose of gripping the handle of a hot cooking utensil. More specifically, the present invention relates to such insulating holders which have a biasing means for holding the device in a normally open configuration to receive or release the pot/pan-handle, with the biasing means being overcome by the grasp of the user when squeezing the device in place on a pan-handle.

BACKGROUND OF THE INVENTION

The culinary arts field has long been motivated to provide auxiliary thermal-insulated handles for cooking utensils. For example, Achberger (U.S. Pat. No. 1,162,896; issued in 1915) discloses an auxiliary cooking utensil handle. The Achberger handle is a separately portable two part handle hinged along the length of one side and opens and closes in clam shell fashion. The Achberger handle includes a spring to radially bias the handle members normally apart. Because the Achberger device opens along the entire length of one side, there is a relatively large opening of the device from which a pan handle can inadvertently slip. However, the Achberger device does incorporate the benefit of being easily (i.e., single handedly) releaseable from a pan handle. A later example is the device of Budelman (U.S. Pat. No. 2,609,563). The Budelman device is an auxiliary skillet handle vertically split along its length into a pair of handle members. The handle members are joined at one end and are pivotable relative to each other. The Budelman handle has the benefit of an adjustable pivot that allows the device to be used with a range of skillet handle widths. However, the Budelman device opens along the entire length of both of its sides, therefore having an even larger opening in the device from which a pan handle can inadvertently slip.

Case metal cookware often presents the problem of needing an auxiliary means of insulating skillet or long pot/pan type handles. Colasent (U.S. Pat. No. 4,209,877) discloses a thermally insulated supplementary handle for cast iron cookware. The Colasent insulating device is a cage or housing affixed over the existing long handle of a pan. More recently, auxiliary pan handle grips made of high temperature resistant rubbers or polymers have become available in the field. These auxiliary grips stretch to slide over and tightly engage the pan handle. These latter insulating grips have the advantage of providing not only an insulating benefit, but also provide a cushioned grip over the metal handle. (See U.S. Pat. No. D456,667 to Veltri et al.). However, both the Colasent handle and the insulating grips are relatively permanently installed onto the pan's handle.

Although the above devices and others in the field may be useful for their intended purposes, it would still be beneficial to the field to have alternative auxiliary thermal insulating handles for use with culinary cookware. Particularly, it would be beneficial to have available such auxiliary insulating handles that may used to easily engage the handle of a hot pan while the pan is being manipulated, but which can be easily removed when manipulation of the pan is finished. This allows one auxiliary handle to be easily used with more than one pan, and allows a kitchen to be equipped with a few representative such auxiliary handles for use with a wide range of pan handles. Importantly, it would be additionally beneficial if the auxiliary handle provided a relatively limited portion of its surface from which an engaged pan handle might inadvertently slip out of the auxiliary handle.

SUMMARY OF THE INVENTION

The present invention is a self-releasing, heat insulating auxiliary pan-handle holder. The present self-releasing insulating handle easily slides on and off the long handle of a cooking utensil such as the handle found on a frying pan or skillet. Because the present auxiliary insulating handle is easily removed from the pan with every use, this allows the auxiliary handle to be easily used with more than one pan, and allows a kitchen to be equipped with a few representative such auxiliary handles for use with a wide range of pan handles. The self-releasing, heat insulating pan-handle holder is used in place of the typical "pot holder" for gripping the handle of a hot pan. Use of the present self-releasing, pan-handle holder provides an easy means for a user to grasp the handle of a hot pan and be thermally insulated from the heat. The pan-handle holder has an opening at one or both ends and an interior space or lumen for receiving the long handle on a pot or pan. By having a receiver opening at only the ends of the auxiliary insulating holder, and not along its sides, the present insulating handle has a relatively reduced risk of an engaged pan handle inadvertently slipping out of the auxiliary handle. The interior space is held in an open configuration by a biasing mechanism. Once a pan-handle is received into the interior space (or lumen) of the present pan-handle holder, the interior space is closed around the handle by the grip of the user overcoming the force of the biasing mechanism that otherwise would hold the holder open.

BRIEF DESCRIPTION OF THE DRAWINGS

FIG. 3A is a perspective view of an insulating sleeve of the present invention, illustrating complimentary sleeve components of the insulating sleeve that are substantially similar or symmetric.

FIG. 3B is an end view of an insulating sleeve of the present invention, illustrating sleeve components of the insulating sleeve that are complimentary, but not symmetric.

FIG. 6C is a side elevation view of a sleeve part of FIG. 6A.

DETAILED DESCRIPTION OF THE INVENTION

Figure 1:
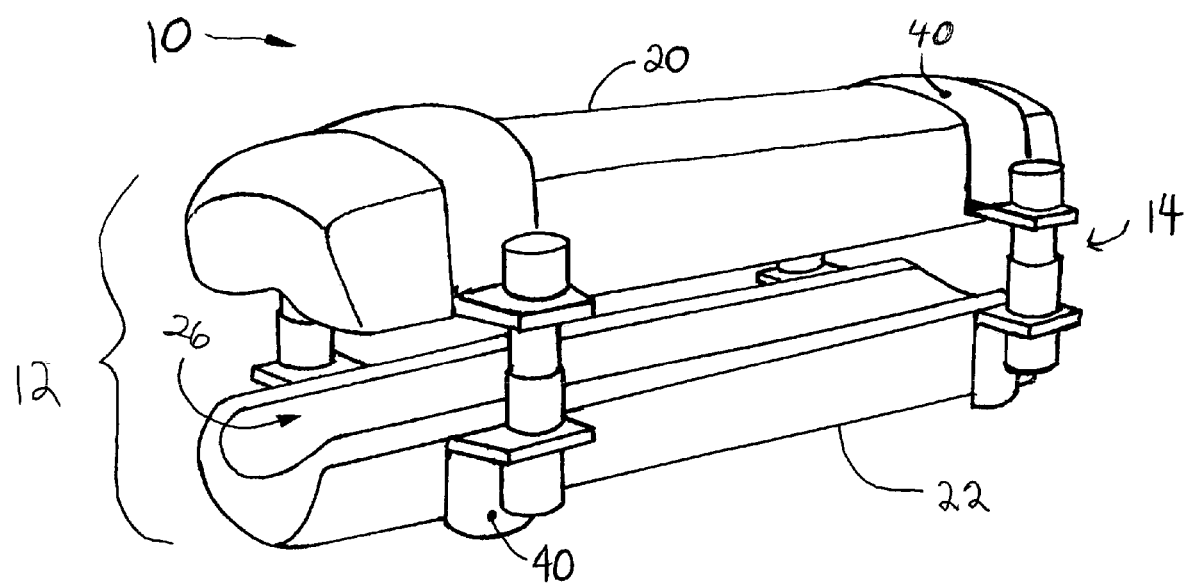
FIG. 1 is a perspective view of a self-releasing, heat insulating pan handle holder of the present invention, with openings at both ends for receiving a pan-handle into the interior space of the holder, and showing a biasing mechanism comprising two bracket and spring type bias assemblies.

Referring now to the drawings, the details of preferred embodiments of the present invention are graphically and schematically illustrated. Like elements in the drawings are represented by like numbers, and any similar elements are represented by like numbers with a different lower case letter suffix.

As shown in FIG. 1, the self-releasing, heat insulating pan-handle holder 10 of the present invention comprises an insulating sleeve 12, and a biasing mechanism 14. The insulating sleeve 12 is fabricated from an appropriate non-metallic thermal insulating material, such thermal insulating materials include wood, plastic, rubber, resin or any other non-metallic material as may be appropriate in consideration of its weight and thermal properties. Metallic materials are specifically avoided because they have the potential to become deceptively hot when directly exposed to a heat source and they conduct electricity.

The insulating sleeve 12 of the self-releasing pan-handle holder 10 is made of a substantially rigid, non-metallic thermal insulating material. In a preferred embodiment, the pan-handle holder 10 was practiced using both wood and plastic. However, other appropriate thermal insulating material are known to and practicable in the present invention by one of ordinary skill in the art. Examples of such other materials include rubber, resin and composite materials (e.g., carbon-fiber). The non-metallic insulating sleeve 12 of the pan-handle holder 10 is divided into two complimentary sections 20 & 22 along a length I (see FIG. 3A) parallel to a sleeve axis 24. The first 20 and second 22 complementary sections respectively have a first 28 and second 30 receiver surfaces (see FIG. 3B) adjoining between them. The receiver surfaces 28 & 30 define the insulating sleeve's interior space or lumen 26 into which the long handle 16 of a pot or pan is received.

Figure 2A:
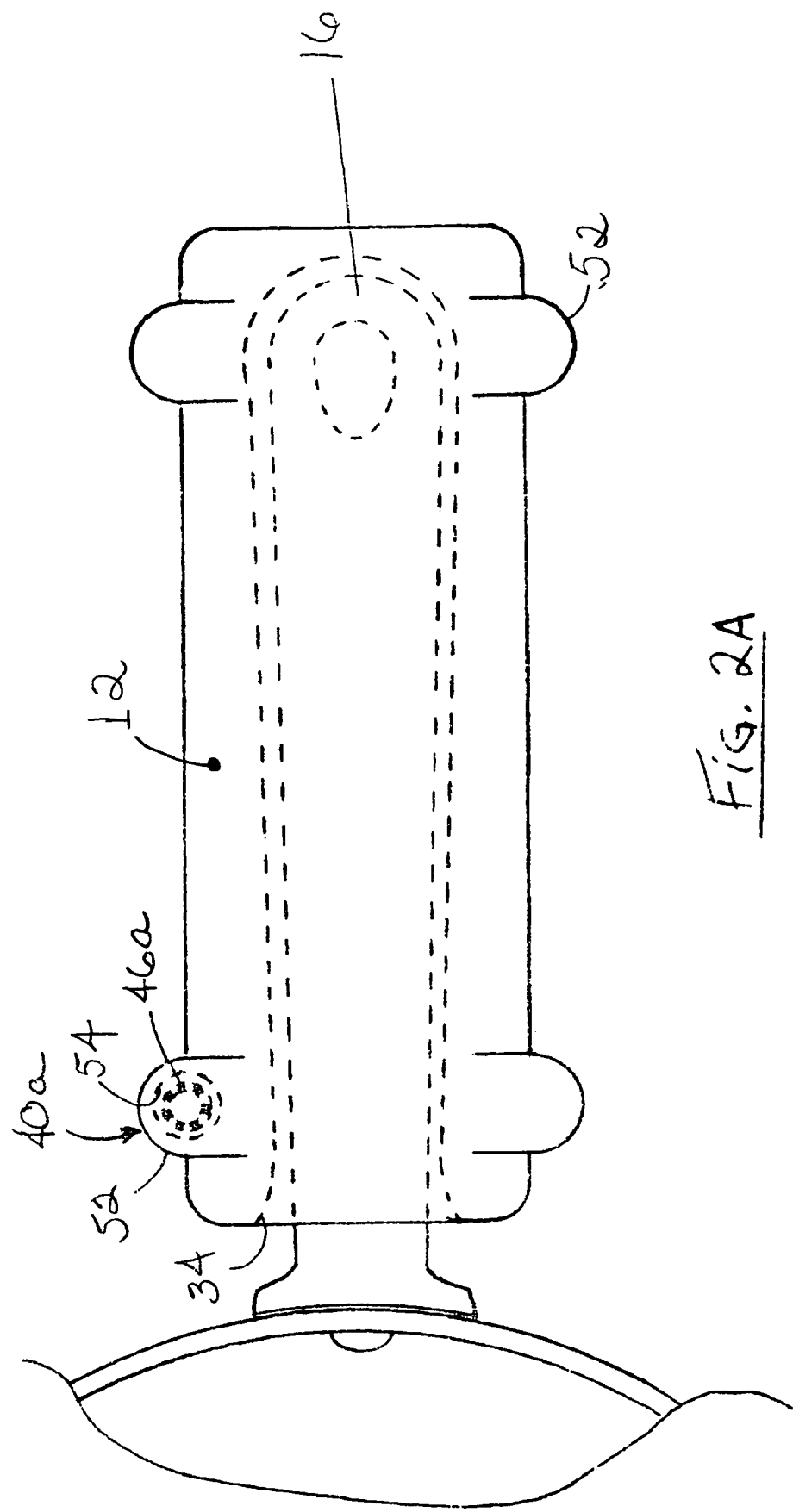
FIG. 2A is a top plan view of an embodiment of the present self-releasing, heat insulating pan-handle holder installed on the long handle of a pot or pan. This embodiment of the device has an opening disposed at only one end and a specifically configured lumen for engaging a pan-handle of a specific shape.
Figure 2B:
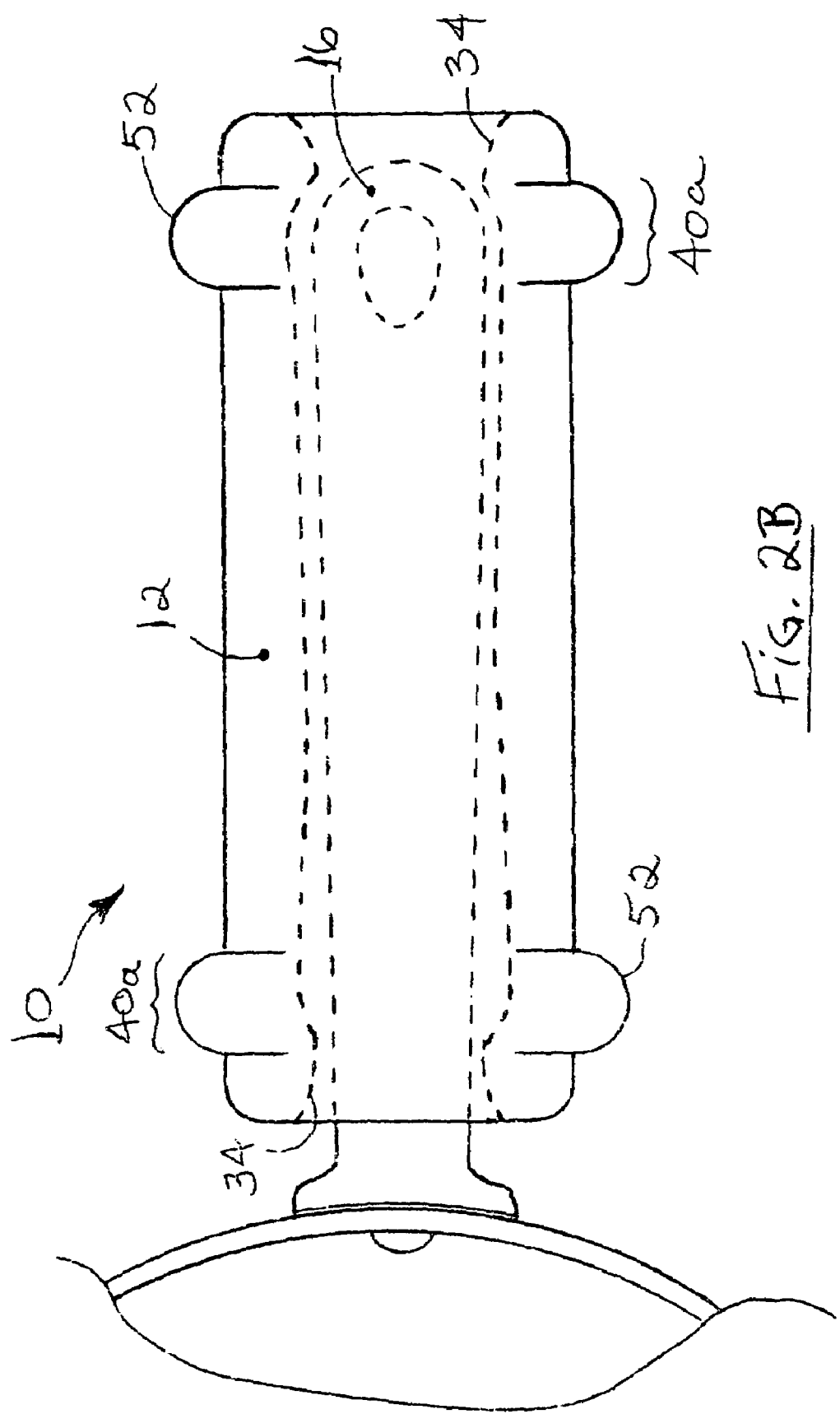
FIG. 2B is a top plan view of an embodiment of the present self-releasing, heat insulating pan-handle holder similar to FIG. 2A, but having openings disposed at both ends and a specifically configured lumen for engaging a pan-handle of a specific shape.

The insulating sleeve 12 has an interior space or lumen 26 defined by the interior surfaces 28 & 30 of the complimentary sections 20 & 22 respectively. The insulating sleeve 12 has an opening 34 in one or both ends (see FIGS. 2A & 2B). The sleeve opening 34 allows a pan-handle 16 to be received into the lumen 26 of the insulating sleeve 12 when in the sleeve 12 is in an open condition. The interior surfaces 28 & 30 of the complimentary sections 20 & 22 are generally configured to fit closely engage a pan-handle 16 received in the lumen 26 when the pan-handle holder 10 is in a closed condition. Alternatively, as shown in FIGS. 2A and 2B, interior surfaces 28 & 30 of the complimentary sections 20 & 22 can be specifically configured to closely engage a specific pan-handle 16 in the lumen 26 of the pan-handle holder 10. Such specific configuration of the lumen 26 can reduce the risk of the pan-handle 16 inadvertently slipping from the present holder 10 when in use.

Additionally, the interior surfaces 28 & 30 preferably have a friction feature 32 to enhance engagement of the pan-handle 16 to prevent the pan-handle 16 from slipping out of the insulating sleeve 12 when the insulating sleeve 12 is in a closed condition. See FIG. 3A. The friction feature 32 can be accomplished by any of a number of means known to one of ordinary skill in the art, such as disposing on the interior surfaces 28 & 30 bumps, suckers, stippling or other anti-slip features.

In a preferred embodiment, the insulating sleeve 12 of the present self-releasing pan-handle holder had the first and second complementary sections 20 & 22 similarly configured with each comprising about half of the insulating sleeve 12. See FIG. 3A. However, as shown in FIG. 3B, the complementary sections 20 & 22 of the insulating sleeve 12 can be asymmetric. A variety of configurations for the insulating sleeve's complimentary sections are practicable in the present invention, the selection of which is accomplishable by the ordinary skilled artisan.

The biasing mechanism 14 of the self-releasing pan-handle holder 10 exerts a biasing force sufficient to hold the complimentary sections 20 & 22 of the insulating sleeve 12 normally apart (i.e., in an "open" condition). However, the biasing force is readily overcome by the grip of a user grasping the pan-handle holder 10, which puts the holder 10 in a "closed" condition. As shown in FIG. 1, in a preferred embodiment, the biasing mechanism comprised a biasing means 14 disposed proximate each end of the insulating sleeve 12. In this embodiment, the bias mechanism displaced the first and second complimentary sections 20 & 22 apart parallel to the sleeve axis 24 of the insulating sleeve 12. The biasing means 14 used in this embodiment were spring and bracket type assemblies 40.

Figure 4:
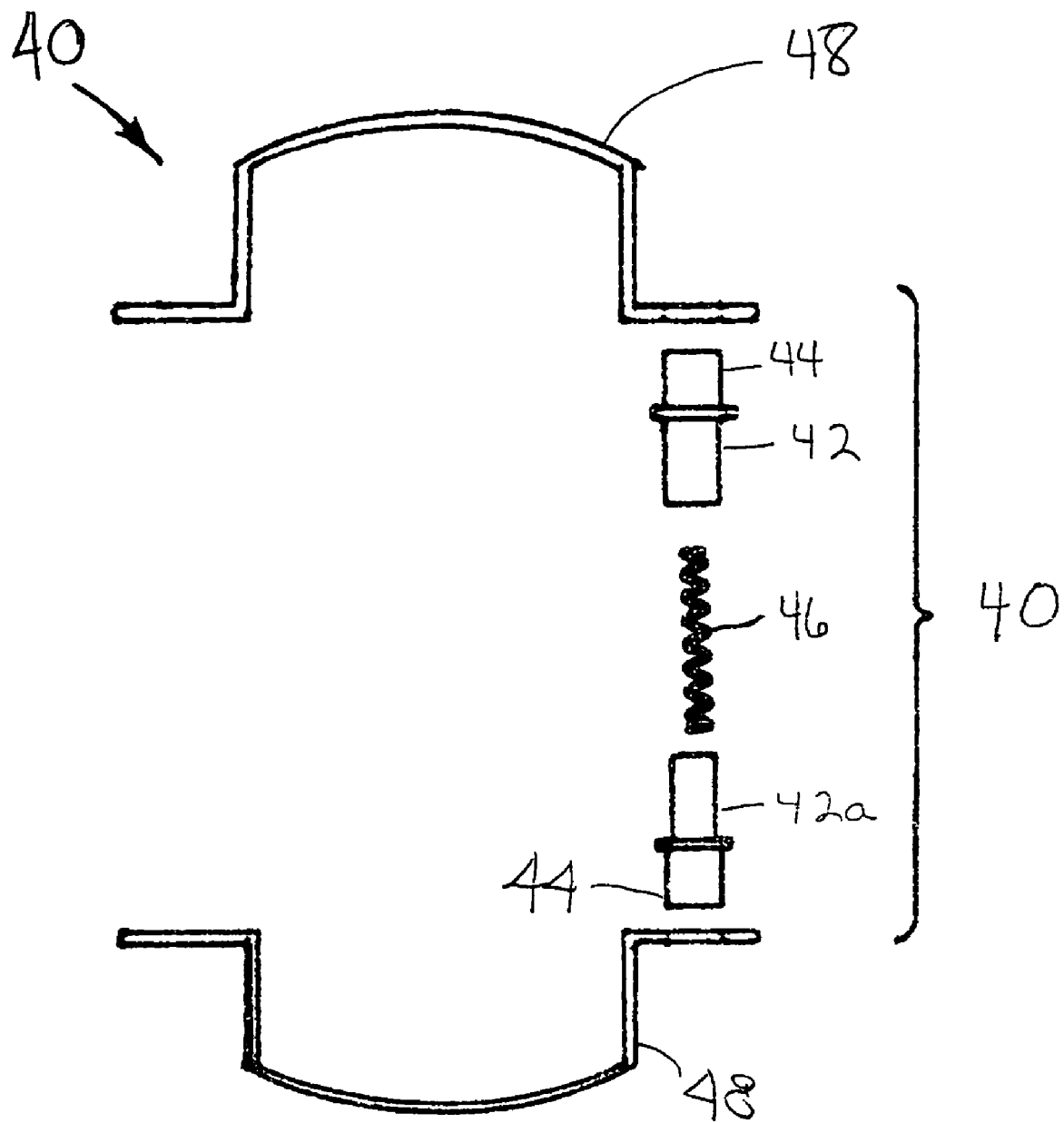
FIG. 4 is an exploded view of a portion of a spring and bracket type assembly used as a biasing means for the biasing mechanism in an embodiment of the present invention.

As noted above, in a preferred embodiment of the present pan-holder device 10, the biasing mechanism 14 was a spring and bracket assembly 40, as shown in FIG. 4. The spring and bracket assembly 40 for practice in the present invention may be accomplished in a number of ways known to one of skill in the art. The spring and bracket assembly 40 shown comprised a telescoping tube 42 & 42a which contained a bias spring 46 set into the spring cap 44 at the closed end of one or both of the telescoping tubes 42 & 42a. FIG. 1 shows two spring and bracket assemblies 40 holding the first 20 and second 22 complimentary sections of the insulating sleeve 12 in an "open" condition. The spring cap 44 at each end of the telescoping tubes 42 & 42a are set into a bracket 48 as shown in FIG. 4.

Figure 5B:
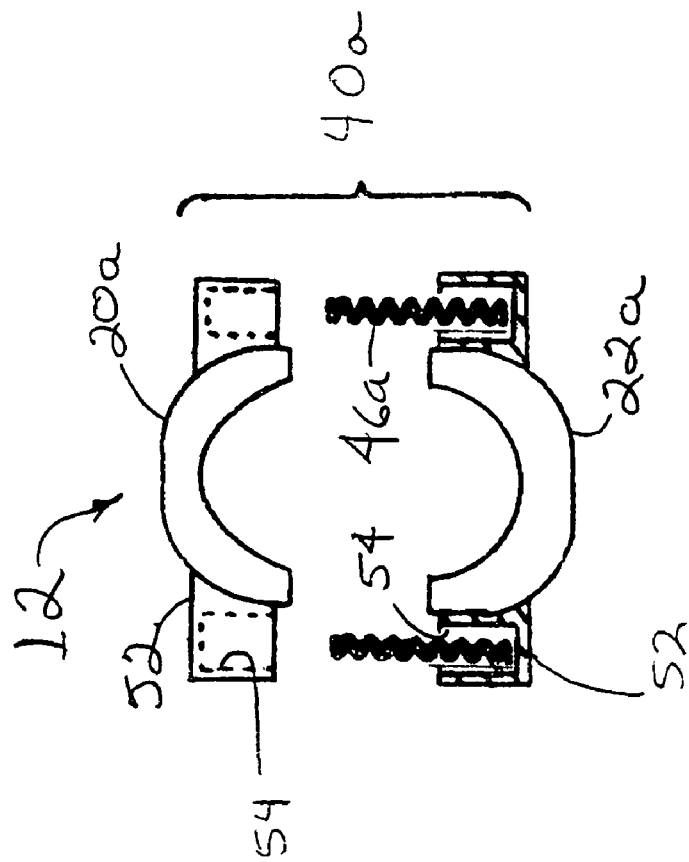
FIGS. 5A and 5B are perspective views of a portion of an embodiment of an insulating sleeve complimentary section (A), and an exploded partial cross-sectional end view of both complimentary sections of an insulating sleeve (B). The figures illustrate a biasing mechanism utilizing a pair of integral biasing means proximate an end of the insulating sleeve.
Figure 5A:
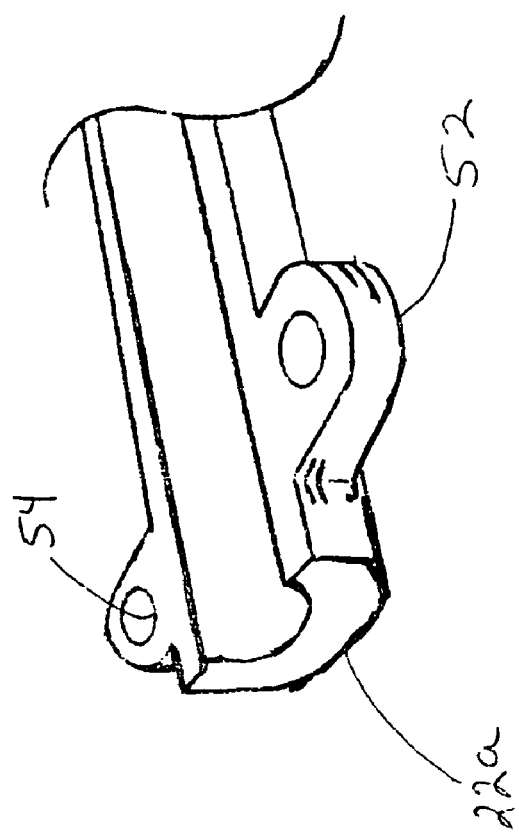

As illustrated in FIGS. 5A and 5B, alternative biasing means are anticipated for practice as the biasing mechanism 14 of the present pan-holder 10. These figures illustrate a integral biasing means 40a, the means being integral in that its components are housed in or integrated with the complementary sections 20a & 22a of the insulating sleeve 12. As illustrated, an integral biasing means 40a comprises a spring housing 52 integrated into the construction of a complimentary sleeve section 20a & 22a. The spring housing 52 has a spring receptacle 54 set into it. One end of a bias spring 46a is fixed in the housing 52 at the bottom of the receptacle 54 on the first sleeve section 22a, while the other end of the bias spring 46a is fixed in the housing 52 at the bottom of the receptacle 54 on the second sleeve section 20a. In this embodiment, four integral biasing means 40a (see FIGS. 2A and 2B) are used to accomplish the biasing mechanism 14 that holds the insulating sleeve 12 in the normally open condition.

Figure 6A:
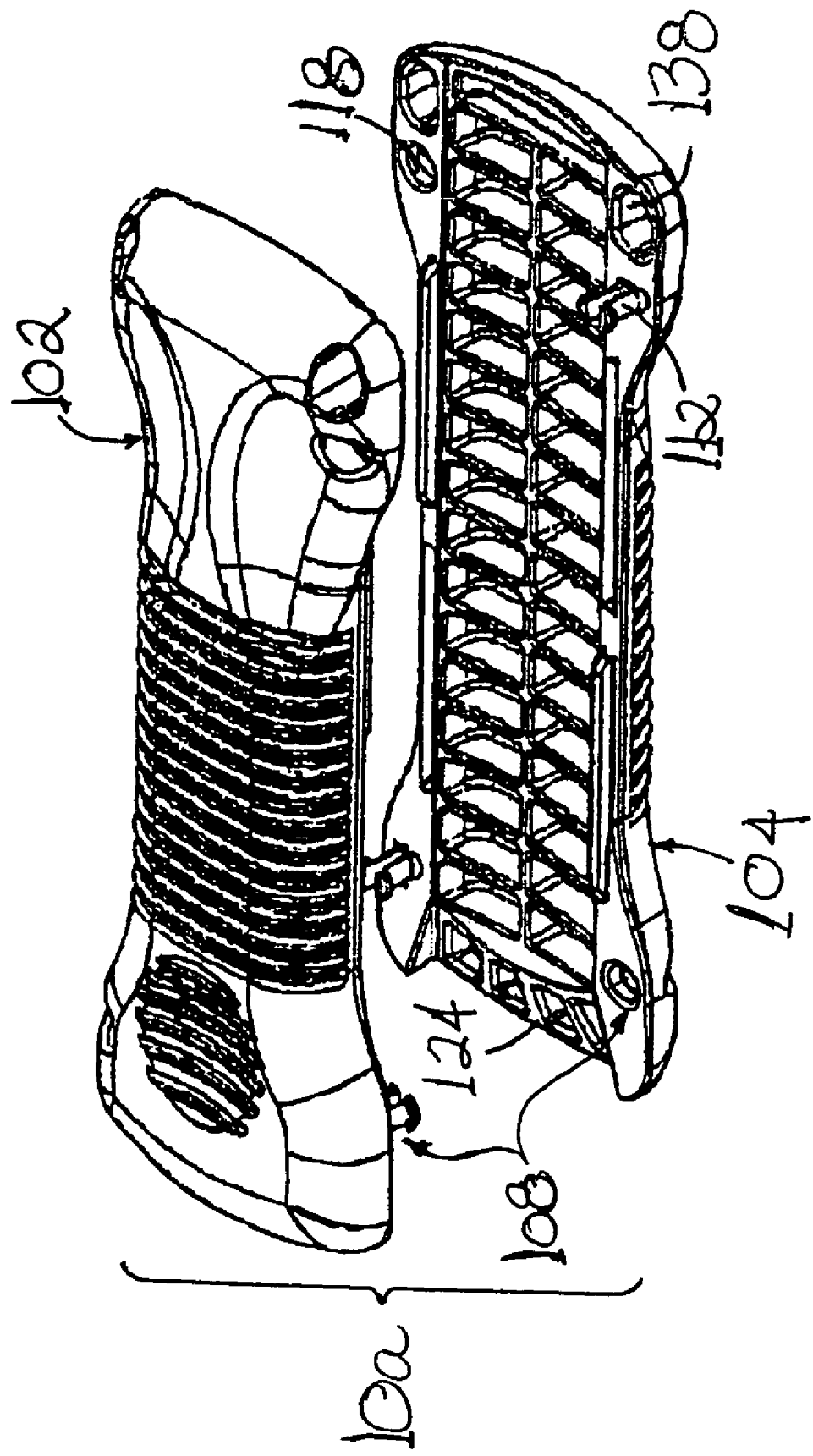
FIG. 6A is an exploded perspective view of the present insulating handle illustrating an embodiment having symmetric complementary sleeve parts.
Figure 6B:
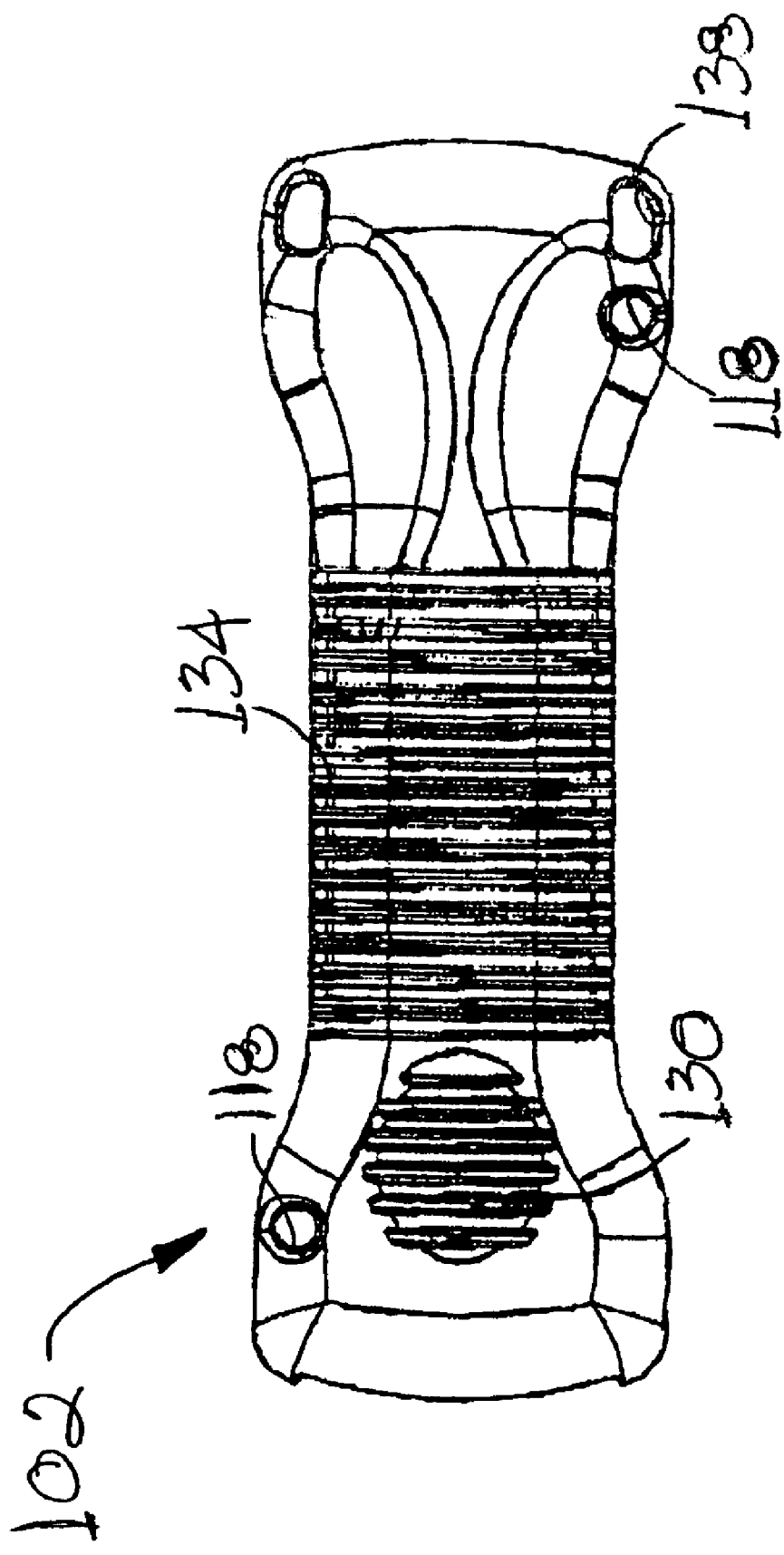
FIG. 6B is a top plan view of a sleeve part of FIG. 6A.

In another preferred embodiment exemplified in FIGS. 6A to 6C, the present insulating handle 10a utilized gravity to bias the complementary handle sections apart. When the handle 10a was installed on a pan handle 16 (e.g., see FIG. 2B), gravity biased the bottom handle section 104 to fall away from the top handle section 102, until the insulating handle 10a was grasped by a user. Upon being grasped by a user, the handle sections 102 & 104 then engaged a pan handle 16 received into the device. In the embodiment shown, the insulating handle 10a had two biasing mechanisms 108 disposed at each end of the handle 10a. The biasing mechanisms 108 each comprised a detent post 110 which was snapped into and loosely held within a slide passage 118. The detent post 110 had a neck portion 112 having a cross-section that allowed it to freely slide within the slide passage 118. The height of the detent post 110 was chosen to allow the handle sections 102 & 104 to be displaced sufficiently to receive a pan handle 16 between them through the handle port opening 124. One of ordinary skill in the art knows how to select an appropriate cross-section and height for the detent post 110, as well as to select alternative gravity biasing mechanisms 108. The embodiment of the insulating handle 10a as illustrated was made of a slightly flexible pliant material that provided a cushioned grip and increased frictional engagement with the pan handle 16 than with more rigid handle materials. As an option, the illustrated handle 10a included hand-grip enhancing features, such as a thumb grip 130 and surface grooves 134. Additionally, the illustrated handle 10a included an optional tether attachment point 138. The tether attachment point was utilized to attach the insulating handle 10a to a retractable tether (not shown) mounted at the waist of a user.

While the above description contains many specifics, these should not be construed as limitations on the scope of the invention, but rather as exemplifications of one or another preferred embodiment thereof. Many other variations are possible, which would be obvious to one skilled in the art. Accordingly, the scope of the invention should be determined by the scope of the appended claims and their equivalents, and not just by the embodiments.

What is claimed is:

1. A self-releasing, heat insulating pan-handle holder comprising: an insulating sleeve of thermal insulating material, the sleeve being divided along a length parallel to a sleeve axis into first and second complimentary sections, with the complimentary sections respectively having first and second receiver surfaces adjoining between them, the receiver surfaces defining a lumen for closely receiving a pan-handle and which lumen surface has a friction feature for engaging the pan-handle; and a biasing mechanism disposed proximate each end of the pan-handle holder, displacing the first and second complimentary sections apart perpendicular to the sleeve axis.

2. The self-releasing, heat insulating pan handle holder of claim 1, wherein the biasing mechanism comprises a post and receiver assembly.

3. The self-releasing, heat insulating pan handle holder of claim 1, wherein the biasing mechanism comprises a gravity biased and post and receiver assembly for displacing the first and second complimentary sections apart.

4. The self-releasing, heat insulating pan handle holder of claim 1, wherein the biasing mechanism comprises a spring biased and post and receiver assembly for displacing the first and second complimentary sections apart.

5. The self-releasing, heat insulating pan handle holder of claim 1, wherein the biasing mechanism comprises a plurality of springs disposed on the insulating sleeve to bias the first and second sleeve sections apart sufficiently to permit a pan-handle to be received in the lumen of the insulating sleeve.

6. A thermally insulating pan-handle holder for use to releaseably engage a long pan-handle, the holder comprising:

a thermal insulating sleeve for receiving the pan-handle, the insulating sleeve being substantially rigid and non-metallic, and separable into a top and a bottom sleeve parts along a length of the sleeve;

a first receiver face on the top sleeve part and a second receiver face on the bottom sleeve part, the receiver faces in combination for closely engaging the pan-handle between them; and at least two bias mechanisms, with at least one of the bias mechanisms disposed proximate each end of the insulating sleeve and tending to bias the sleeve parts away from each other to allow a pan-handle to be received between the two handle parts, the bias means being overcome by a user gripping the holder and squeezing the sleeve parts together to closely engage the pan-handle against the receiver faces of the sleeve parts.

* * * * *